(12) United States Patent
Baumann et al.

(10) Patent No.: US 6,515,065 B1
(45) Date of Patent: Feb. 4, 2003

(54) PROTECTIVE COLLOIDS

(75) Inventors: Carsten Baumann, Monheim (DE); Dieter Feustel, Monheim (DE); Norbert Huebner, Duesseldorf (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 08/913,380

(22) PCT Filed: Mar. 4, 1996

(86) PCT No.: PCT/EP96/00899

§ 371 (c)(1),
(2), (4) Date: Sep. 11, 1997

(87) PCT Pub. No.: WO96/28489

PCT Pub. Date: Sep. 19, 1996

(30) Foreign Application Priority Data

Mar. 11, 1995 (DE) .......................................... 195 08 856

(51) Int. Cl.⁷ ............................................... C08L 75/00
(52) U.S. Cl. ....................................... 524/507; 526/201
(58) Field of Search ........................... 526/201; 524/507

(56) References Cited

U.S. PATENT DOCUMENTS

| 3,660,010 A | 5/1972 | Georgoudis et al. ......... 8/115.6 |
| 4,337,184 A | 6/1982 | Schimmel et al. .......... 524/726 |
| 4,918,129 A | 4/1990 | Probst et al. ................ 524/457 |

FOREIGN PATENT DOCUMENTS

| DE | 42 42 687 | 6/1994 |
| EP | 0 334 032 | 9/1989 |
| FR | 2539135 | 7/1984 |
| WO | WO94/13726 | 6/1994 |

*Primary Examiner*—Bernard Lipman
(74) *Attorney, Agent, or Firm*—John E. Drach

(57) ABSTRACT

Water-soluble nonionic polyurethanes as protective colloids for the polymerization of olefinically unsaturated monomers in aqueous medium wherein the water-soluble nonionic polyurethanes have been prepared by reacting a) organic polyisocyanates with b) water-soluble polyalkylene glycols containing at least 70% by weight of ethylene glycol groups and with c) polyhydric branched alcohols containing at least three hydroxyl groups per molecule and wherein the equivalent ratio of b) to c) is in the range from 1:0.01 to 1:10 and the equivalent ratio of [b)+c)] to a) is in the range from 1:0.6 to 1:0.85.

9 Claims, No Drawings

PROTECTIVE COLLOIDS

BACKGROUND OF THE INVENTION

1. Field of the Invention

This invention relates generally to the polymerization of unsaturated monomers in aqueous medium and, more particularly, to protective colloids for such polymerization processes. The protective colloids according to the invention are water-soluble nonionic polyurethanes produced from polyiso-cyanates, water-soluble polyalkylene glycols with an ethylene glycol content of at least 70% by weight and branched alcohols containing at least three hydroxyl groups which are characterized by a certain ratio of water-soluble polyalkylene glycols to polyhydric branched alcohols.

Protective colloids are mainly used in suspension, emulsion and dispersion polymerization. Suspension polymerizations are polymerizations of water-insoluble monomers in water, the polymerization reactions taking place in monomer droplets where they are initiated by oil-soluble initiators. The water-insoluble monomers are suspended in water in the form of numerous small monomer droplets by addition of a suspending agent. Emulsion polymerizations are generally radical polymerizations of water-insoluble monomers emulsified in water. In emulsion polymerizations, in contrast to suspension polymerizations, the polymerization reaction does not take place in monomer droplets, but in micelles or latex particles which are produced by addition of interfacially active substances (emulsifiers, detergents, soaps). There are also emulsion polymerizations which take place in the absence of an emulsifier, although their exact reaction mechanism is not yet known. Dispersion polymerizations are emulsion polymerizations "in reverse" where an aqueous phase is dispersed in an organic phase.

In the polymerization processes listed above, the function of protective colloids is to stabilize the polymer dispersions during and after polymerization of the monomers. This is done by adsorption of the protective colloids to the surface of the polymer particles which results in steric hindrance so that the polymer particles are prevented from coagulating. Conventional protective colloids are water-soluble partly and fully hydrolyzed polyvinyl acetates with various polyvinyl alcohol contents which, in addition, are available in various molecular weights. The higher the molecular weight of the polyvinyl acetate/polyvinyl alcohols, the higher the viscosities to which the dispersions of polymers or polymer particles can be adjusted.

Other known protective colloids are polyvinyl pyrrolidone, cellulose ethers, starch and cellulose. These known protective colloids perform entirely satisfactorily although the resistance of the final polymer dispersions to freezing and thawing is in need of improvement where polyvinyl acetate/polyvinyl alcohol is added as the protective colloid.

However, since protective colloids remain in the polymer, the properties of the polymer can be adversely affected by the known protective colloids. For example, polymer films based on emulsion polymers of vinyl acetate are always very hard and, in addition, sensitive to alkalis and water where the conventional protective colloids are used. It would be desirable if the polymer films in question could have improved resistance to water and alkalis and, in addition, could be far more flexible so that the need for external plasticizers could be reduced or eliminated altogether.

2. Discussion of Related Art

It is known from WO 94113726 that water-soluble polyurethanes produced from diisocyanates, a water-soluble polyethylene glycol and optionally a hydrophobic diol can be used as protective colloids in emulsion polymerization. Where these water-soluble polyurethanes are used as protective colloids in emulsion polymerization, stable dispersions of polyvinyl acetate or the copolymer of vinyl acetate and maleic acid dibutyl ester are obtained. In addition, films obtained from these dispersions are relatively flexible and water-resistant.

The disadvantage of the polyurethanes known from WO 94/13726 is that a certain viscosity can only be more or less adjusted in the polymer dispersions produced with these polyurethanes.

However, there is a demand among manufacturers of polymer dispersions for protective colloids on the lines of polyvinyl acetate/polyvinyl alcohol where the viscosities of the polymer dispersions can be adjusted as required by varying the molecular weights of the protective colloids.

EP-B-334 032 describes oligourethanes which have a branched molecular structure and which are terminated by hydrophilic groups. The hydrophilic groups are preferably ionic groups, such as carboxylate or quaternary ammonium groups. These oligourethanes are produced from polyisocyanates, hydrophobic polyhydric polyols and monofunctional compounds containing hydrophilic groups of the type described above. They may be used as emulsifiers in emulsion polymerization.

The problem addressed by the present invention was to provide protective colloids which, through variation of their chemical structure, would be capable of adjusting polymer dispersions to the required viscosities. In addition, the films obtainable from the polymer dispersions would show improved resistance to water and alkalis and would also be relatively flexible so as to reduce or eliminate the need for external plasticizers. The protective colloids would of course also provide for stable dispersions of the polymers as reflected above all in increased resistance to freezing and thawing.

DESCRIPTION OF THE INVENTION

According to the invention, this problem has been solved by water-soluble nonionic polyurethanes as protective colloids for the polymerization of olefinically unsaturated monomers in aqueous medium, characterized in that the water-soluble nonionic polyurethanes have been produced by reaction of a) organic polyisocyanates with b) water-soluble polyalkylene glycols containing at least 70% by weight of ethylene glycol units and with c) polyhydric branched alcohols containing at least three hydroxyl groups per molecule, the equivalent ratio of b) to c) being in the range from 1:0.01 to 1:10.

"Nonionic" in the context of the present invention means that the polyurethane does not contain any ionic groups as emulsifying groups, i.e. does not contain any carboxylate, sulfonate, phosphonate or ammonium groups. Rather is the dispersibility of the polyurethane attributable to the presence of the water-soluble polyalkylene glycols which contain at least 70% by weight of ethylene glycol units, based on polyalkylene glycols, and preferably at least 80% by weight of ethylene glycol units. In the context of the invention, the polyalkylene glycols are "water-soluble" providing more than 10 g remain dissolved in 100 g of water for more than 6 months at 20° C.

Ethylene glycol units correspond to the formula $-[CH_2-CH_2-O]_n-$, where n is the degree of oligomerization.

Suitable water-soluble polyalkylene glycols are polyethylene glycols produced by polyaddition of ethylene oxide to water or to ethylene glycol as the starter molecule and also polyaddition products of ethylene oxide with other low molecular weight diols, such as butanediol, hexanediol or 4,4'-dihydroxydiphenyl propane. Several water-soluble polyethylene glycols differing in their average molecular weight may also be used. Copolymers of ethylene oxide and propylene oxide are also suitable providing the content of ethylene glycol units is at least 70% by weight, based on copolymer, and preferably at least 80% by weight.

Water-soluble polyethylene glycols with an average molecular weight in the range from 500 to 100,000, preferably in the range from 1,000 to 20,000 and more particularly in the range from 3,000 to 12,000 are particularly preferred.

It is crucial to the invention that branched alcohols containing at least three hydroxyl groups per molecule are used as an additional polyol component for the production of the polyurethanes. The equivalent ratio of the polyalkylene glycols described above to the branched alcohols containing three hydroxyl groups is another particularly important factor.

Preferred branched alcohols containing at least three hydroxyl groups are trimethylol propane, pentaerythritol, glycerol, ditrimethylol propane, dipentaerythritol and alkoxylates thereof. Suitable alkoxylates are, for example, trimethylol propane containing 5 to 10 moles of propylene oxide. Trimethylol propane is particularly suitable.

Now, the chemical modification of the polyurethane which enables the viscosity of the final polymer dispersions to be adjusted as required can be obtained through the equivalent ratio of the water-soluble polyalkylene glycols to the branched alcohols containing at least three hydroxyl groups. The final polymer dispersions can be adjusted to a higher viscosity, the higher the selected percentage content of branched alcohols containing at least three hydroxyl groups in relation to the water-soluble polyalkylene glycols. In a preferred embodiment, the equivalent ratio of water-soluble polyalkylene glycols to the branched alcohols containing at least three hydroxyl groups is in the range from 0.1 to 5:1 and, more particularly, in the range from 0.1 to 3:1.

If the equivalent quantities of water-soluble polyalkylene glycols are significantly below the ranges indicated above, difficulties could arise in regard to the self-dispersion of the polyurethanes. Significantly larger equivalent quantities of water-soluble polyalkylene glycols than those indicated above impair the possibilities for adjusting the viscosities of the final polymer dispersions.

Suitable polyisocyanates are diisocyanates and the products formed by partial trimerization of the isocyanate groups of diisocyanates. Examples of suitable isocyanates are 1,5-naphthylene diisocyanate, 4,4'-diphenyl methane diisocyanate (MDI), hydrogenated MDI ($H_{12}MDI$), xylylene diisocyanate (XDI), tetramethyl xylylene diisocyanate (TMXDI), 4,4'-diphenyl dimethyl methane diisocyanate, di- and tetraalkyl diphenyl methane diisocyanate, 4,4'-dibenzyl diisocyanate, 1,3-phenylene diisocyanate, 1,4-phenyl diisocyanate, the isomers of toluene diisocyanate (TDI), 1-methyl-2,4-diisocyanatocyclohexane, 1,6-diisocyanato-2,2,4-trimethyl hexane, 1,6-diisocyanato-2,4,4-trimethyl hexane, 1-isocyanatomethyl-3-isocyanato-1,5,5-trimethyl cyclohexane (IPDI), chlorinated and brominated diisocyanates, phosphorus-containing diisocyanates, 4,4'-diisocyanatophenyl perfluoroethane, tetramethoxybutane-1,4-diisocyanate, butane-1,4-diisocyanate, hexane-1,6-diisocyanate (HDI), dicyclohexyl methane diisocyanate, cyclohexane-1,4-diisocyanate, ethylene diisocyanate, phthalic acid bis-isocyanatoethyl ester and diisocyanates containing reactive halogen atoms, such as 1-chloromethylphenyl-2,4-diisocyanate, 1-bromomethylphenyl-2,6-diisocyanate, 3,3-bis-chloromethylether4,4'-diphenyl diisocyanate. Sulfur-containing polyisocyanates are obtained, for example, by reaction of 2 moles of hexamethylene diisocyanate with 1 mole of thiodiglycol or dihydroxydihexyl sulfite. Other important diisocyanates are trimethyl hexamethylene diisocyanate, 1,4-diisocyanatobutane, 1,12-diisocyanatododecane and dimer fatty acid diisocyanate. Tetramethylene diisocyanate, hexamethylene diisocyanate, undecane diisocyanate, dodecane methylene diisocyanate, 2,2,4-trimethyl hexane diisocyanate, 1,3-cyclohexane diisocyanate, 1,4-cyclohexane diisocyanate, 1,3- and 1,4-tetramethyl xylene diisocyanate, isophorone diisocyanate, 4,4-dicyclohexyl methane diisocyanate and lysine ester diisocyanate are particularly suitable. Tetramethyl xylene diisocyanate, especially the m-TMXDI produced by Cyanamid, is most particularly preferred.

The equivalent ratio of OH to NCO, where "OH" is the sum of the polyalkylene glycols and branched alcohols containing at least three hydroxyl groups, i.e. b)+c), may vary within wide limits. The NCO component is preferably used in less than the equivalent quantity, so that preferred equivalent ratios of OH to NCO are from 1:0.99 to 1:0.5, preferably from 1:0.9 to 1:0.55 and more preferably from 1:0.85 to 1:60.

The polyurethanes according to the invention may be produced both in a single-stage process and in a two-stage process. In the two-stage process, a prepolymer is first produced by partly pre-reacting the polyols, for example the hydrophilic polyalkylene glycols, with the diisocyanate. The branched polyol is then added.

However, the polyurethane according to the invention is preferably produced in a single-stage process. To this end, all the starting materials are initially mixed at a water content of less than 0.5% by weight, optionally in the presence of an organic solvent. The mixture is heated for about 1 to 30 hours to a temperature of 70 to 200° C., preferably to a temperature of 75 to 180° C. and more preferably to a temperature of 80 to 170° C. The reaction time can be shortened by the presence of catalysts. Particularly useful catalysts are tertiary amines, for example triethylamine, dimethyl benzylamine, bis-dimethylaminoethyl ether and bis-methylaminomethyl phenol. 1-Methyl imidazole, 2-methyl-1-vinyl imidazole, 1-allyl imidazole, 1-phenyl imidazole, 4-dimethylaminopyridine, 4-pyrrolidinopyridine, 4-morpholinopyridine, 4-methyl pyridine are particularly suitable. However, the reaction is preferably carried out in the absence of a catalyst. The solvent is also preferably omitted. Suitable solvents are inert organic liquids with a boiling point below 200° C. at normal pressure.

The polyurethanes are wax-like to solid compounds at room temperature. The described polyurethanes are miscible with water in any ratio and are preferably used as protective colloids in the form of aqueous solutions or dispersions.

The present invention also relates to a process for the production of aqueous dispersions of polymers of olefinically unsaturated monomers in the presence of protective colloids, characterized in that water-soluble nonionic polyurethanes produced by reaction of a) organic polyisocyanates with b) water-soluble polyalkylene glycols containing at least 70% by weight of ethylene glycol units and with c) polyhydric branched alcohols containing at least three hydroxyl groups per molecule, the equivalent ratio of b) to c) being from 1:0.01 to 1:10, are present as the protective colloids.

Particulars of the protective colloids can be found in the foregoing.

The process for producing the aqueous polymers may be carried out by the known mechanisms of suspension, emulsion or dispersion polymerization, the polymerization reaction being carried out at the usual temperatures, preferably in the range from 10 to 150° C., in the presence of the usual polymerization initiators in the usual quantities, preferably peroxides, peroxodisulfates or azo compounds in quantities of 0.05 to 5% by weight, based on monomers, and optionally in the presence of the usual suspending agents or emulsifiers used in the usual quantities. The polymerization may be carried out discontinuously, continuously or on the feed principle.

The process is suitable for the production of aqueous dispersions of polymers of a variety of olefinically unsaturated monomers, for example those listed in the above-cited EP 334 032.

The process according to the invention is preferably used for the production of aqueous dispersions of polymers of acrylates and methacrylates containing 1 to 12 carbon atoms in the alcohol component, acrylic acid, methacrylic acid and the $C_{2-4}$ hydroxyalkyl esters of these acids, styrene, acrylonitrile and methacrylonitrile, vinyl acetate, vinyl propionate, vinyl chloride and vinylidene chloride, more particularly aqueous dispersions of vinyl acetate and vinyl chloride. Homopolymers and copolymers may be produced by the process. The process according to the invention gives particularly good results where the protective colloid is used in the production of aqueous dispersions of polyvinyl acetate, polyvinyl chloride and copolymers of ethylene and vinyl acetate.

It has proved to be of advantage for the protective colloids to be present in quantities of 0.01 to 20% by weight and preferably in quantities of 0.05 to 15% by weight, based on the dispersion.

Where redispersible polymers are required, the protective colloids are present in quantities in the upper range mentioned above. For emulsion polymerizations, quantities of 1.5 to 10% by weight of protective colloid, based on the dispersion, are generally sufficient. The aqueous dispersions of polymers produced by the process according to the invention are stable, substantially coagulate-free, storable and transportable dispersions which, in addition, are characterized by very good resistance to freezing and thawing.

The polymer dispersions produced by the process according to the invention may be used for various applications. Thus, the aqueous dispersions of polymers of olefinically unsaturated monomers may be used for the production of coatings on any substrates, for example for the coating and impregnation of woven and nonwoven textiles, leather, metals, ceramics, stone, concrete, plastics, paper and for glass and porcelain.

Another important application is the use of the aqueous polymer dispersions for interior and exterior coatings on plaster, concrete, masonry, wood and paper.

The aqueous polymer dispersions produced by the process according to the invention may also be used in adhesives where they may be employed, for example, as a basis for the production of water-soluble hotmelt adhesives or remoistenable adhesives for paper, wall coverings and labels.

EXAMPLES

A) Production and Properties of the Polyurethanes
Example A1)

In a 2 liter three-necked flask equipped with a stirrer and nitrogen inlet pipe, 95 parts of Polywachs 6000 (polyethylene glycol Lipoxol of Hüls; corresponding to 1 equivalent) and 0.53 part of trimethylol propane (corresponding to 0.35 equivalent) were freed from water for 2 hours at 80° C./1 mbar reduced pressure and then purged with nitrogen. 4.47 Parts of m-TMXDI (Cyanamid, corresponding to 1.08 equivalents) were then added, followed by stirring at 145° C. The theoretical NCO content of 0% was reached after about 3 hours.

Example A2)

The procedure was as in A1), except that 94.3 parts of Polywachs 6000 (corresponding to 1 equivalent), 0.75 part of trimethylol propane (corresponding to 0.5 equivalent) and 4.9 parts of TMXDI (corresponding to 1.2 equivalents) were used.

Example A3)

The procedure was as described in A1), except that 93.2 parts of Polywachs 6000 (corresponding to 1 equivalent), 1.1 part of trimethylol propane (corresponding to 0.75 equivalent) and 5.7 parts of TMXDI (corresponding to 1.4 equivalents) were used.

B) Production of the Aqueous Polymer Dispersions

B1) Production of an Aqueous Polyvinyl Acetate Dispersion

In a reaction vessel equipped with a stirrer, thermometer, two dropping vessels and a reflux condenser, 10 g of a reaction product of p-nonylphenol ethoxylated with 10 moles . . . of ethylene oxide, 0.5 g of sodium hydrogen carbonate and 75 g of a 40% by weight aqueous solution of the polyurethanes produced in accordance with A1), A2) or A3) were mixed at room temperature in 394.25 g of deionized water and heated to 65° C. A solution of 0.5 g of sodium formaldehyde sulfoxylate in 10 g of deionized water was added to the resulting solution at 65° C. 459 g of vinyl acetate monomer were placed in dropping vessel A while a mixture of 0.75 g of t-butyl hydroperoxide and 50 g of deionized water was placed in dropping vessel B.

The continuous addition from dropping vessels A and B was commenced at temperatures of 72° C. After the onset of the polymerization, the continuous addition from A and B was controlled in such a way that a reaction temperature of 72 to 80° C. was established. The reaction time was about 3 hours. The reaction mixture was left to after-react for 1 hour at >80° C.

All the dispersions obtained are stable coagulate-free dispersions with good freezing/thawing stability (freezing for 16 hours at −20° C., thawing for 8 hours, etc.). The viscosities of the polymer dispersions obtained (Brookfield viscosities in mPas at 25° C.) are set out in Table I. The aqueous polymer dispersions obtained were knife-coated onto a glass plate in a layer thickness of 100μ to determine their resistance to water and alkalis and in a layer thickness of 250μ to determine the König pendulum hardness. The properties of the films obtained are also set out in Table I.

TABLE I

| Polymer Dispersion Containing Protective Colloid | Viscosity of the Polymer Dispersion [mPas] | Water Resistance[3] | Alkali Resistance[1] | König Pendulum Hardness [in s] |
|---|---|---|---|---|
| A1) | 16,000 | 3 | 2 | 79 |
| A2) | 35,000 | 2 | 2 | 63 |
| A3) | 56,000 | 1 | 1 | 59 |
| 40% by weight aqueous solution of polyvinyl alcohol from Hoechst Mowiol 23-88[2] | 15,000 | 5 | 4 | 140 |

[1] against 10% by weight sodium hydroxide
[2] comparison
[3] subjective scale of scores of 1 to 6 where 1 = very good.

It can be seen from Table I that the viscosity of the polymer dispersion can be adjusted as required through the equivalent quantities of trimethylol propane in the polyurethane (protective colloid). It can also be seen that the resistance of the films obtainable from the polymer dispersions to water and alkalis is improved by comparison with films which have been obtained using conventional protective colloids. Finally, the König pendulum hardness shows that the films are more flexible than the films obtained using conventional protective colloids (lower values correspond to more flexible films).

B2) Production of an Aqueous Ethylene-co-vinyl Acetate Dispersion 154.1 kg of deionized water, 9.8 kg of a 25% by weight solution of an ethoxylated nonylphenol containing on average 23 ethylene oxide units and 14.1 kg of a 40% aqueous solution of a polyurethane prepared in accordance with A2) were introduced into a pressure reactor equipped with a stirrer, addition facilities, vacuum, ethylene and nitrogen pipes and with heating and cooling facilities and adjusted with acetic acid to pH 4, after which 0.47 kg of a 1% by weight iron ammonium sulfate solution was added. After purging with nitrogen, 23.7 kg of vinyl acetate were incorporated by emulsification, the contents of the reactor were heated to 65° C. and the ethylene pressure was adjusted to 22 bar. The polymerization was initiated by the addition of 11.9 kg of a 3% by weight peroxodisulfate solution and 11.9 kg of a 1.5% by weight sodium hydroxymethane sulfinate solution. After addition of the initiator had started, 213.3 kg of vinyl acetate and a mixture of 22.3 kg of a 40% by weight solution of the above-mentioned polyurethane dispersion and 9.5 kg of a 50% by weight solution of N-methylol acrylamide were introduced. After the reaction was over, the reaction mixture was cooled and vented, followed by afterpolymerization with 0.133 kg of t-butyl hydroperoxide and 0.052 kg of Na hydroxymethane sulfonate—each in 0.97 kg of water. Stable coagulate-free dispersions were obtained.

B3) Production of an Aqueous PVC Dispersion by Suspension Polymerization 1278.8 g of deionized water, 2 g of a 40% by weight aqueous dispersion of the polyurethane produced in accordance with Example A2), 0.2 g of sodium hydrogen carbonate, 0.8 g of sorbitan monolaurate and 0.64 g of Perkadox® 16 (peroxo initiator from Akzo) were introduced into a pressure reactor. 800 g of vinyl chloride were introduced into the pressure reactor, a pressure of 9.2 to 9.8 bar being spontaneously established. Polymerization was carried out for 3.5 hours at a temperature of 55° C. and was followed by afterpolymerization for another 5 hours. The reaction was terminated when the pressure fell below 5 bar. The reactor was vented to remove excess monomer.

A stable coagulate-free dispersion was obtained.

After drying of the dispersion, a PVC powder with a powder density of 430 g/l was obtained in a yield of 82%.

What is claimed is:

1. The process of preparing aqueous dispersions of polymers of olefinically unsaturated monomers in the presence of protective colloids comprising water-soluble nonionic polyurethanes, said nonionic polyurethanes comprising the reaction products of
   a) organic polyisocyanates with
   b) water-soluble polyalkylene glycols containing at least 70% by weight of ethylene glycol groups and with
   c) polyhydric branched alcohols containing at least three hydroxyl groups per molecule, and wherein
the equivalent ratio of b) to c) is in the range from 1 0:01 to 1:10 and the equivalent ratio of [b)+c)] to a) is in the range from 1:0.6 to 1 0.85.

2. A process as in claim 1 wherein said water-soluble polyethylene glycols have average molecular weights in the range from 500 to 100,000.

3. A process as in claim 1 wherein said polyhydric branched alcohols are selected from the group consisting of trimethylol propane, glycerol, pentaerythritol, ditrimethylol propane, dipentaerythritol and alkoxylates thereof.

4. A process as in claim 1 wherein the equivalent ratio of b) to c) is in the range from 0.1 to 5:1.

5. A process as in claim 1 wherein said isocyanates comprise tetramethylene xylylene diisocyanate.

6. A process as in claim 1 wherein said dispersions of polymers comprise vinyl acetate and vinyl chloride.

7. A process as in claim 1 wherein said aqueous polyurethanes are present in a quantity of 0.01% to 20% by weight, based on the total weight of said dispersions.

8. A process as in claim 1 including applying said aqueous dispersions of polymers of olefinically unsaturated monomers as a coating on a substrate.

9. A process as in claim 1 including employing said dispersions of polymers of olefinically unsaturated monomers as a base for adhesives.

* * * * *